United States Patent
Qiu et al.

(10) Patent No.: US 11,062,112 B2
(45) Date of Patent: Jul. 13, 2021

(54) FINGERPRINT DETECTION DEVICE AND METHOD AND ELECTRONIC DEVICE

(71) Applicant: SHENZHEN GOODIX TECHNOLOGY CO., LTD., Shenzhen (CN)

(72) Inventors: Fangfang Qiu, Shenzhen (CN); Li Huang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/944,158

(22) Filed: Jul. 31, 2020

(65) Prior Publication Data

US 2020/0364440 A1     Nov. 19, 2020

Related U.S. Application Data

(63) Continuation of application No. 16/414,777, filed on May 16, 2019, now Pat. No. 10,776,599, and a
(Continued)

(51) Int. Cl.
*G06K 9/00*     (2006.01)
*G06F 3/03*     (2006.01)

(52) U.S. Cl.
CPC ....... *G06K 9/00013* (2013.01); *G06F 3/0304* (2013.01); *G06K 2009/0006* (2013.01)

(58) Field of Classification Search
CPC ....... G06K 9/00013; G06K 2009/0006; G06K 9/2018; G06K 9/2027; G06K 9/0004; G06K 9/00046; G06F 3/0304
See application file for complete search history.

(56) References Cited

U.S. PATENT DOCUMENTS

| 9,177,190 B1 | 11/2015 | Chou et al. |
| 2006/0072795 A1 | 4/2006 | Sano et al. |

(Continued)

FOREIGN PATENT DOCUMENTS

| CN | 103699884 A | 4/2014 |
| CN | 104063704 A | 9/2014 |

(Continued)

OTHER PUBLICATIONS

Young-Hyun Baek, etc., "The fake fingerprint detection system using a novel color distribution", 2016 International Conference on Information and Communication Technology Convergence (ICTC), Oct. 21, 2016, pp. 1111-1113.
(Continued)

*Primary Examiner* — Abhishek Sarma
(74) *Attorney, Agent, or Firm* — Scully Scott Murphy & Presser (57) ABSTRACT

Embodiments of the present application provide a fingerprint detection device and method and an electronic device. The fingerprint detection device is disposed under a display screen of an electronic device, and includes an optical component and an optical sensor, the optical component is configured to direct or converge a fingerprint detection signal to the optical sensor, the optical sensor is configured to detect corresponding fingerprint information according to the fingerprint detection signal, the fingerprint detection signal is a reflected light signal formed by a light signal corresponding to a predetermined pattern formed in a fingerprint detection area of the display screen being reflected by a user's finger, and the predetermined pattern includes a first pattern and a second pattern; a signal intensity of a first light signal corresponding to the first pattern is smaller than a signal intensity of a second light signal corresponding to the second pattern.

19 Claims, 6 Drawing Sheets

Related U.S. Application Data continuation of application No. PCT/CN2018/109328, filed on Oct. 8, 2018.

(56) References Cited

U.S. PATENT DOCUMENTS

| | | |
|---|---|---|
| 2010/0208954 A1 | 8/2010 | Wu |
| 2017/0109560 A1 | 4/2017 | Chen et al. |
| 2018/0068160 A1 | 3/2018 | Lee |
| 2018/0189546 A1 | 7/2018 | Chang et al. |
| 2019/0102598 A1 | 4/2019 | Jiang |

FOREIGN PATENT DOCUMENTS

| | | |
|---|---|---|
| CN | 106599766 A | 4/2017 |
| CN | 106940787 A | 7/2017 |
| CN | 106981503 A | 7/2017 |
| CN | 107065274 A | 8/2017 |
| CN | 107292294 A | 10/2017 |
| CN | 107590428 A | 1/2018 |
| CN | 107644202 A | 1/2018 |
| CN | 107657238 A | 2/2018 |
| CN | 107748874 A | 3/2018 |
| CN | 107820617 A | 3/2018 |
| CN | 107918768 A | 4/2018 |
| CN | 107967876 A | 4/2018 |
| CN | 108121939 A | 6/2018 |
| CN | 207529397 U | 6/2018 |
| CN | 207558065 U | 6/2018 |
| CN | 108391447 A | 8/2018 |
| CN | 108446677 A | 8/2018 |
| CN | 108550610 A | 9/2018 |
| WO | 2016090439 A1 | 6/2016 |

OTHER PUBLICATIONS

Praveen K. Shahi et al. "A strategy to achieve efficient dual-mode luminescence in lanthanide-based magnetic hybrid nanostructure and its demonstration for the detection of latent fingerprints", Journal of Colloid and Interface Science, vol. 491, Apr. 1, 2017, pp. 199-206, ISSN 0021-9797.

Handbook of Fingerprint Recognition, 2nd edition., Springer-Verlag London Limited 2009, Sep. 17, 2009, p. 167-169 and 206.

FINGERPRINT DETECTION DEVICE AND METHOD AND ELECTRONIC DEVICE

CROSS-REFERENCE TO RELATED APPLICATIONS

The present application is a continuation of U.S. patent application Ser. No. 16/414,777, filed on May 16, 2019, which is a continuation of international application No. PCT/CN2018/109328, filed on Oct. 8, 2018, which is hereby incorporated by reference in its entirety.

TECHNICAL FIELD

The present application relates to the technical field of optical fingerprints, and in particular, to a fingerprint detection device and method and an electronic device.

BACKGROUND

Application of an optical fingerprint device has brought a safe and convenient user experience to users. However, based on a principle of optical imaging, a light intensity of a central portion of a fingerprint detection area is usually greater than that of an edge portion of the fingerprint detection area, and as a result, a signal in an edge portion detected by an optical fingerprint device is weaker than a signal in a central portion detected. Apart from the above, due to influence of factors such as poor contact caused by finger drying, the signal in the edge portion becomes weaker, resulting in a lower fingerprint identification rate.

SUMMARY

Provided are a fingerprint detection device and method and an electronic device, which could improve a fingerprint identification rate.

In a first aspect, provided is a fingerprint detection device, configured to be disposed under a display screen of an electronic device, including an optical component and an optical sensor, where the optical component is configured to direct or converge a fingerprint detection signal to the optical sensor, and the optical sensor is configured to detect corresponding fingerprint information according to the fingerprint detection signal, where the fingerprint detection signal is a reflected light signal formed by a light signal, corresponding to a predetermined pattern formed in a fingerprint detection area of the display screen, being reflected by a user's finger, and the predetermined pattern includes a first pattern and a second pattern; and the first pattern does not overlap with the second pattern at least in part, the first pattern is closer to a center of the fingerprint detection area than the second pattern, and a signal intensity of a first light signal corresponding to the first pattern is smaller than a signal intensity of a second light signal corresponding to the second pattern.

In some possible implementation manners, the predetermined pattern includes a gradient spot having a plurality of patterns, and light signals corresponding to the plurality of patterns decrease sequentially in a descending order of a distance from a center of the fingerprint detection area. In some possible implementation manners, a gray scale value and/or a ratio of three primary colors, Red, Green and Blue, RGB of the first pattern is different from those of the second pattern.

In some possible implementation manners, if the first pattern and the second pattern are in a same color, a gray scale value of the first pattern is smaller than a gray scale value of the second pattern.

In some possible implementation manners, the predetermined pattern is formed in the fingerprint detection area by a target light signal emitted by a light source, where the light source includes at least one of a red light source, a green light source and a blue light source.

In some possible implementation manners, the light source is a part of self-emitting display units of the display screen in the fingerprint detection area, and the red light source, the green light source and the blue light source are red display units, a green display units and a blue display units of the display screen, respectively.

In some possible implementation manners, the device further includes: a light source driving module configured to drive the light source to emit the first light signal and the second light signal respectively in a central detection area and an edge detection area of the fingerprint detection area such that the display screen displays the first pattern and the second pattern in the fingerprint detection area, respectively.

In some possible implementation manners, the light source driving module controls gray scale values and/or ratios of three primary colors, Red, Green and Blue, RGB of the first light signal and the second light signal emitted by at least one of the red light source, the green light source and the blue light source such that a gray scale value and/or a ratio of three primary colors, Red, Green and Blue, RGB of the first pattern are different from those of the second pattern.

In some possible implementation manners, the light source driving module is a display driving module or a display driver for driving the display screen to perform screen display.

In some possible implementation manners, the light source is an external light source and the external light source is disposed under the display screen.

In some possible implementation manners, the optical sensor is further configured to: when the light source emits sampling light signals with a same color and a same gray scale value to the fingerprint detection area, sample light signals in different areas of the fingerprint detection area, and detect sampling values of the light signals, where the sampling values are used to determine the signal intensity of the first light signal and the signal intensity of the second light signal.

In some possible implementation manners, the device further includes a processing module configured to determine the signal intensity of the first light signal and the signal intensity of the second light signal according to the sampling values of the light signals in the different areas of the fingerprint detection area detected by the optical sensor.

In a second aspect, provided is a fingerprint detection method, including: forming a predetermined pattern on a fingerprint detection area of a display screen of an electronic device, where the predetermined pattern includes a first pattern and a second pattern, the first pattern does not overlap with the second pattern at least in part, the first pattern is closer to a center of the fingerprint detection area than the second pattern, and a signal intensity of a first light signal corresponding to the first pattern is smaller than a signal intensity of a second light signal corresponding to the second pattern; and detecting a reflected light signal formed by a target light signal, corresponding to the predetermined pattern, being reflected by a user's finger, and obtaining fingerprint information of the user's finger according to the reflected light signal, when the user's finger is pressed against the predetermined pattern of the fingerprint detection area.

In some possible implementation manners, the method further includes: determining the signal intensity of the first light signal and the signal intensity of the second light signal of the target light signal.

In some possible implementation manners, the determining the signal intensity of the first light signal and the signal intensity of the second light signal of the target light signal includes: emitting sampling light signals with a same color and a same gray scale value to the fingerprint detection area; and determining the signal intensity of the first light signal and the signal intensity of the second light signal according to sampling values of the sampling light signals in an area where the first pattern and the second pattern are located.

In some possible implementation manners, a gray scale value and/or a ratio of three primary colors, Red, Green and Blue, RGB of the first pattern is different from those of the second pattern.

In some possible implementation manners, if the first pattern and the second pattern are in a same color, a gray scale value of the first pattern is smaller than a gray scale value of the second pattern.

In some possible implementation manners, the predetermined pattern is formed in the fingerprint detection area by a target light signal emitted by a light source, where the light source includes at least one of a red light source, a green light source and a blue light source; and the method further includes controlling gray scale values and/or ratios of three primary colors, Red, Green and Blue, RGB of the first light signal and the second light signal emitted by at least one of the red light source, the green light source and the blue light source such that a gray scale value and/or a ratio of three primary colors, Red, Green and Blue, RGB of the first pattern are different from those of the second pattern.

In some possible implementation manners, the predetermined pattern includes a gradient spot having a plurality of patterns, and light signals corresponding to the plurality of patterns decrease sequentially in a descending order of a distance from a center of the fingerprint detection area.

In a third aspect, provided is a chip, including an input and output interface, at least one processor, at least one memory and a bus, where the at least one memory is configured to store instructions, the at least one processor is configured to call the instructions in the at least one memory to execute the method in the second aspect or any possible implementation manner of the second aspect.

In a fourth aspect, provided is an electronic device, including: a display screen and a fingerprint detection device disposed under the display screen, where the fingerprint detection device is the fingerprint detection device according to the first aspect or any possible implementation manner of the first aspect.

In a fifth aspect, provided is an electronic device, including a chip according to the third aspect.

In a sixth aspect, provided is a computer readable medium, configured to store a computer program, where the computer program includes instructions used to execute the method in the second aspect or any possible implementation manner of the second aspect.

In a seventh aspect, provided is a computer program product including an instruction, where when a computer runs the instructions of the computer program product, the computer executes the method of fingerprint identification in the forgoing second aspect or any possible implementation manner of the second aspect.

Specifically, the computer program product may be run on the electronic device of the foregoing fourth aspect to the fifth aspect.

DESCRIPTION OF EMBODIMENTS

Technical solutions of the present application will be described hereinafter in conjunction with the accompanying drawings.

It should be understood that embodiments of the present application can be applied to an optical fingerprint system, including but not limited to an optical fingerprint identification system and a medical diagnostic product based on optical fingerprint imaging. The embodiments of the present application are only described by the example of an optical fingerprint system, however, it should not constitute any limitation to the embodiments of the present application, and the embodiments of the present application are also applicable to other systems that adopt an optical imaging technology, or the like.

It should also be understood that the technical solutions of the embodiments of the present application can perform other biometric identification in addition to fingerprint identification, for example, a living body identification and the like, which is not limited in the embodiments of the present application.

As a common application scenario, an optical fingerprint system provided in an embodiment of the present application can be applied to a smart phone, a tablet computer, and other mobile terminals having a display screen or other terminal devices. More specifically, in the foregoing terminal device, a fingerprint capturing device may be specifically an optical fingerprint device, which may be disposed in a partial area or an entire area under a display screen, thereby forming an under-display optical fingerprint system.

Figure 1:
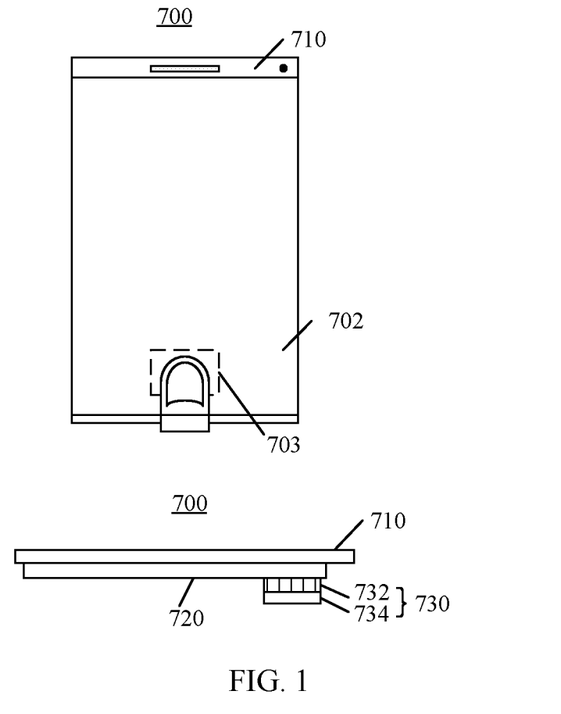
FIG. 1 is a schematic structural diagram of a terminal device applicable to an embodiment of the present application.

FIG. 1 shows a schematic structural diagram of a terminal device applicable to an embodiment of the present application. A terminal device 700 includes a display screen 720 and an optical fingerprint device 730, where the optical fingerprint device 730 is disposed in a partial area under the display screen 720. The optical fingerprint device 730 includes a sensing array having a plurality of optical sensing units, and an area where the sensing array is located or an optical sensing area thereof is a fingerprint detection area 703 of the optical fingerprint device 730. As shown in FIG. 1, the fingerprint detection area 703 is located in a display area 702 of the display screen 720. Therefore, when a user needs to unlock the terminal device or perform other fingerprint verification, fingerprint input can be implemented only by pressing a finger against the fingerprint detection area 703 on the display screen 720. Since fingerprint detection can be implemented inside the screen, there is no need to exclusively reserve space for a front surface of the terminal device 700 adopting the above structure to set a fingerprint button (such as a Home button).

As a preferred embodiment, the display screen 720 may adopt a display screen having self-emitting display units, for example, an organic light-emitting diode (OLED) display screen or a micro light-emitting diode (micro-LED) display screen. Taking adoption of an OLED display screen as an example, the optical fingerprint device 730 can utilize display units (i.e., an OLED light source) of the OLED display screen 720 located in the fingerprint detection area 703 as an excitation light source for optical fingerprint detection.

In other embodiments, the optical fingerprint device 730 may also adopt an internal light source or an external light source to provide a light signal for fingerprint detection. In such a case, the optical fingerprint device 730 can be applied to a non-self-emitting display screen, for example, a liquid crystal display screen or other passive light-emitting display screens. Taking application to a liquid crystal display screen having a backlight module and a liquid crystal panel as an example, the optical fingerprint device 730 may further include an excitation light source for optical fingerprint detection in order to support under-screen fingerprint detection of the liquid crystal display screen. The excitation light source may be specifically an infrared light source or a light source of non-visible light of a specific wavelength, which may be disposed under the backlight module of the liquid crystal display screen or disposed in an edge area under a protective cover of the terminal device 700, while the optical fingerprint device 730 is disposed under the backlight module, and the backlight module allows light for fingerprint detection to pass through the liquid crystal panel and the backlight module and reach the sensing array of the optical fingerprint device 730 by providing a through hole or performing other optical designs on a film layer such as a diffusion sheet, a brightening sheet, a reflection sheet, or the like.

Moreover, the sensing array of the optical fingerprint device 730 may be specifically a photo detector array including a plurality of photo detectors arranged in an array, and the photo detectors may serve as the optical sensing units as described above. When a finger is pressed against the fingerprint detection area 703, light emitted by the display units of the fingerprint detection area 703 is reflected by fingerprints on a finger surface to form reflected light, and reflected light of a ridge of a finger fingerprint is different from that of a valley of the finger fingerprint. The reflected light is returned to the display screen 720, received by the photo detector array, and converted into a corresponding electrical signal, i.e., a fingerprint detection signal. Based on the fingerprint detection signal, fingerprint image data can be acquired, and fingerprint matching verification can be further performed, thereby achieving an optical fingerprint identification function on the terminal device 700.

It should be understood that the terminal device 700 further includes a transparent protective cover 710 in a specific implementation, and the cover 710 may be a glass cover or a sapphire cover, which is located above the display screen 720 and covers a front surface of the terminal device 700. Therefore, in an embodiment of the present application, the so-called finger being pressed against the display screen 720 actually refers to being pressed against the cover 710 above the display screen 720 or a surface of the protective layer covering the cover 710.

As an alternative implementation manner, as shown in FIG. 1, the optical fingerprint device 730 includes a light detecting portion 734 and an optical component 732. The light detecting portion 734 includes the sensing array, and a readout circuit and other auxiliary circuits electrically connected to the sensing array which may be fabricated in a die by a semiconductor process. That is, the light detecting portion 734 may be fabricated in an optical imaging chip or an image sensing chip. The optical component 732 may be disposed above the sensing array of the light detecting portion 734, and may specifically include a filter layer, a light directing layer, and other optical elements, the filter layer may be used to filter ambient light passing through a finger, and the light directing layer is mainly used to direct reflected light reflected from a finger surface to the sensing array for optical detection.

In a specific implementation, the optical component 732 may be encapsulated in the same optical fingerprint chip with the optical detecting portion 734, or the optical component 732 may be disposed outside the chip where the optical detecting portion 734 is located, for example, the optical component 732 is attached above the chip, or some components of the optical component 732 are integrated into the chip. The light directing layer of the optical component 732 has various implementations, for example, the light directing layer may be specifically an optical path modulator or an optical path collimator fabricated on a semiconductor silicon wafer or other base materials, and the optical path modulator or an optical path collimator has a plurality of optical path modulating units or collimating units which may be specifically micro hole arrays. Alternatively, the light directing layer may also be an optical lens layer having one or more lens units, such as a lens group composed of one or more aspheric lenses. Optically collimated or converged by the micro hole arrays or the lens units, reflected light reflected from a finger is received by the optical sensing unit underneath, such that the sensing array may detect a fingerprint image of a finger.

In other alternative implementation manners, the display screen 720 may also adopt a non-self-emitting display screen, for example, a backlight liquid crystal display screen, in which case the optical detection device 730 cannot adopt a display unit of the display screen 720 as an excitation light source. Therefore, there is a need to integrate an excitation light source inside the optical detection device 730 or set an excitation light source outside to achieve optical fingerprint detection, and a detection principle thereof is consistent with the above described content.

It should be understood that the optical fingerprint device in the embodiment of the present application may also be referred to as an optical fingerprint identification module, a fingerprint device, a fingerprint identification device, a fingerprint identification module, a fingerprint module, a fingerprint capturing device, or the like.

Generally, regardless of the fact that the optical fingerprint device 730 adopts self-emitting display units of the display screen 720 or an external light source as an excitation light source for fingerprint detection, a light signal emitted by the excitation light source for fingerprint detection is usually a solid color light signal, and a spot formed by such a light signal in the fingerprint detection area 703 is usually a solid color spot. Due to the principle of optical imaging of an optical component (for example, a lens) in the optical fingerprint device 730, an intensity of a light signal in the central area of the lens is usually greater than that of a light signal in the edge area, resulting in that a signal magnitude captured by the optical fingerprint device 730 in the edge area of the lens (corresponding to the edge detection area of the fingerprint detection area 703) is smaller than that in the central area of the lens (corresponding to the central detection area of the fingerprint detection area 703). Besides, due to poor contact in an edge of a finger, it makes the difference between the signal magnitude in the central detection area with good contact of a finger and the signal magnitude in the edge detection area with poor contact larger, and finally a fingerprint identification rate is lower.

In view of this, embodiments of the present application provide a fingerprint detection solution. By configuring a light signal emitted by an excitation light source for fingerprint detection, an intensity of a light signal emitted to an edge detection area is greater than that of a light signal emitted to a central detection area. Therefore, a signal magnitude in the edge detection area among fingerprint signals captured by the optical fingerprint device 730 could be increased, a difference between the signal magnitude in the edge detection area and that in the central detection area could be reduced, and further, a fingerprint identification rate could be improved.

Figure 2:
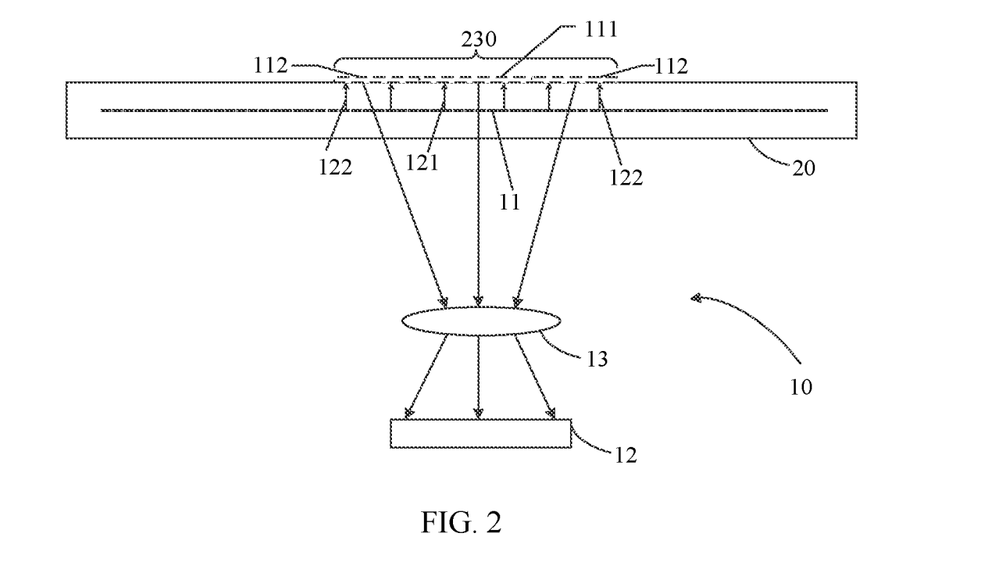
FIG. 2 is a schematic diagram showing a systematic structure of a fingerprint detection device according to an embodiment of the present application.

FIG. 2 is a schematic diagram showing a systematic structure of a fingerprint detection device 10 provided in an embodiment of the present application. As shown in FIG. 2, the fingerprint detection device 10 may be disposed under a display screen 20 of a terminal device. In the embodiment of the present application, the display screen 20 may correspond to the display screen 720 shown in FIG. 1, and a fingerprint detection area 230 of the display screen 20 may be the fingerprint detection area 703 shown in FIG. 1. In the embodiment shown in FIG. 2, the display screen 20 may be specifically a self-emitting display screen (such as an OLED display screen), and includes a plurality of self-emitting display units 11 (such as OLED pixels or OLED light sources). The self-emitting display units 11 are configured to emit light under the driving of a display driving module such that the display screen 20 displays a corresponding image.

In the display screen 20, a part of the self-emitting display units 11 in the fingerprint detection area 230 can be used as an excitation light source of the fingerprint detection device 10 for fingerprint detection, for the purpose of transmitting a target light signal to the fingerprint detection area 230 so as to form a predetermined target pattern.

Specifically, the excitation light source 11 is configured to emit a target light signal to the fingerprint detection area 230 of the display screen 20, the target light signal includes a first light signal 121 and a second light signal 122, and the first light signal 121 and the second light 122 form a first pattern 111 and a second pattern 112 in the fingerprint detection area, respectively, where the first pattern 111 does not overlap with the second pattern 112 at least in part, the first pattern 111 is closer to a center of the fingerprint detection area 230 than the second pattern 112, and a signal intensity of the first light signal 121 is less than a signal intensity of the second light signal 122.

Correspondingly, a target pattern displayed in the fingerprint detection area 230 of the display screen 20 based on the first light signal 121 and the second light signal 122 is specifically a non-solid color pattern or a non-solid color spot including the first pattern 111 and the second pattern 112. A gray scale value of the first pattern 111 is smaller than a gray scale value of the second pattern 112.

It should be noted that in some embodiments, the fingerprint detection device 10 may be a fingerprint module, or may also be disposed in a fingerprint module, or the fingerprint detection device 10 may include a fingerprint module. In other embodiments, the fingerprint detection device 10 may be an electronic device or may be disposed in an electronic device.

Figure 3:
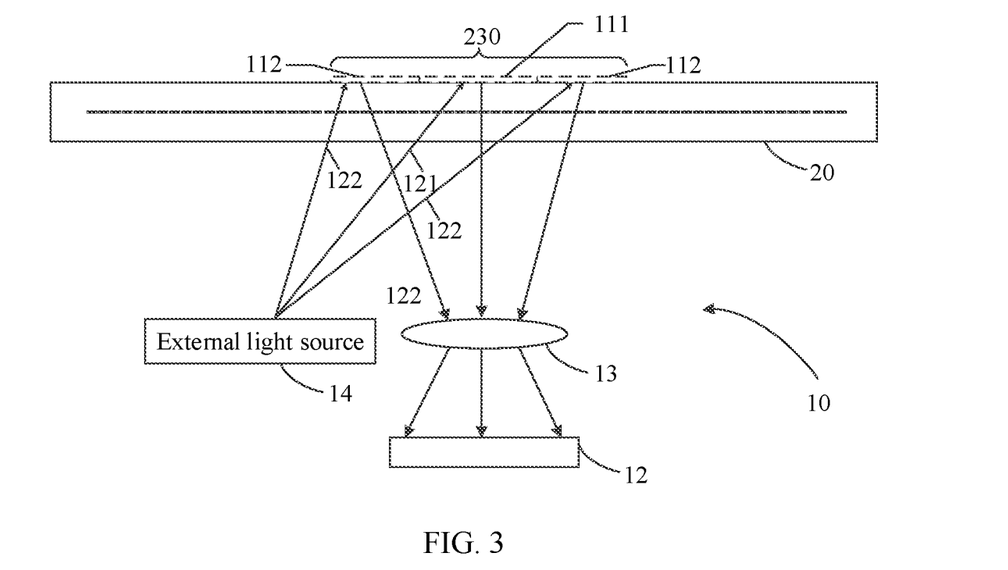
FIG. 3 is a schematic diagram showing a systematic structure of a fingerprint detection device according to another embodiment of the present application.

Optionally, in the embodiment of the present application, the excitation light source 11 may be implemented by using a part of the self-emitting display units of the display screen 20 in the fingerprint detection area 230, or in other alternative embodiments, the excitation light source 11 may also be an external light source 14 additionally provided in the fingerprint detection device 10, such as an infrared light source. As shown in FIG. 3, the external light source 14 is also disposed under the display screen 12 for emitting the first light signal 121 and the second light signal 122 to the fingerprint detection area 230 of the display screen 12.

In some embodiments, the fingerprint detection device 10 may further include an optical sensor 12, configured to receive a reflected light signal formed by the target light signal being reflected by a surface of a target object (for example, a user's finger) on the fingerprint detection area 230, where the reflected light signal can be used as a fingerprint detection signal to determine fingerprint information of the user for subsequent fingerprint identification.

The optical sensor 12 may correspond to an optical fingerprint chip of the light detecting portion 734 in FIG. 1, and details are not described herein.

In the embodiment of the present application, the device 10 may further include an optical component 13. In the embodiment shown in FIG. 2, the optical component 13 may specifically include one or more optical lenses that may converge or direct a reflected light signal or a fingerprint detection signal passing through the display screen 230 to the optical sensor 12. Specifically, the optical component 13 may be the optical component 732 in FIG. 1, and details are not described herein.

In the fingerprint detection device 10 of the embodiment of the present application, the excitation light source 11 is controlled to emit a plurality of light signals with different intensities to the fingerprint detection area 230 of the display screen 20, and the plurality of light signals are illuminated to different positions of the fingerprint detection area 230 so as to form spots (or referred to as patterns) with different colors or gray scale values. For example, the target light signal emitted by the light source may include the first light signal 121 and the second light signal 122, and the first light signal 121 and the second light signal 122 are illuminated on the fingerprint detection area 230 to form the first pattern 111 and the second pattern 112, respectively, where the first pattern 111 does not overlap with the second pattern 112 at least in part, and the first pattern 111 is closer to a center of the fingerprint detection area than the second pattern 112. In the embodiment of the present application, by applying different driving signals or control signals to the excitation light source 11, the signal intensity of the first light signal 121 emitted by the excitation light source 11 can be controlled to be smaller than the signal intensity of the second light signal 122. Therefore, even if contact in the edge detection area is not good or an optical imaging effect of the edge detection area is not good, the signal intensity of the second light signal 122 is controlled to be greater than the signal intensity of the first light signal 121, such that the signal intensity of the reflected light signal from the edge detection area could be increased to a certain degree, a signal magnitude of the fingerprint detection signal obtained by the optical sensor 12 from the edge detection area could be increased, and further, a fingerprint identification rate could be improved.

Therefore, in a fingerprint detection device of the embodiment of the present application, a light source is controlled to emit light signals of different intensities to different areas of the fingerprint detection area, for example, a signal intensity of a light signal emitted to an edge detection area of the fingerprint detection area is controlled to be greater than that of a light signal emitted to a central detection area of the fingerprint detection area, such that the signal magnitude in the edge detection area could be increased, a difference between the signal magnitude in the edge detection area and that in the central detection area could be reduced, and further, a fingerprint identification rate could be improved.

Optionally, in the embodiment of the present application, taking use of self-emitting display units of the display screen 20 as the excitation light source 11 of the fingerprint detection device 10 as an example, a display driving module may be used to drive a gray scale value and/or a ratio of three primary colors, Red, Green and Blue (RGB) of a light signal emitted by the self-emitting display unit of the display screen 20 in the fingerprint detection area 230 such that the signal intensity of the second light signal is greater than the signal intensity of the first light signal.

Specifically, the excitation light source 11 may include a red light source, a green light source and a blue light source, such as red display units, green display units and blue display units of the display screen 20. The display driving module controls gray scale values and/or ratios of light signals emitted by the three light sources, such that signal intensities of light signals emitted to the edge detection area and the central detection area can be controlled, and meanwhile, patterns formed in the edge detection area and the central detection area of the fingerprint detection area 230 also have the corresponding gray scale values and colors.

If a single green light source is used to emit a light signal to the edge detection area and the central detection area as excitation light for fingerprint detection when the fingerprint detection device 10 performs fingerprint detection, for example, the display driving module control the green display units of the display screen 20 in the fingerprint detection area 230 to emit light, and the red display units and the blue display units not to emit light, the display driving module controls a gray scale value of a light signal emitted by the green display units in the central detection area to be smaller than a gray scale value of a light signal emitted by the green display units in the edge detection area, such that a gray scale value of a green pattern formed in the central detection area is smaller than a gray scale value of a green pattern formed in the edge detection area; alternatively, a brightness of the green pattern in the edge detection area is greater than a brightness of the green pattern in the central detection area.

If a red light source, a green light source and a blue light source are used to emit light signals to the edge detection area and the central detection area as excitation light for fingerprint detection when the fingerprint detection device 10 performs fingerprint detection, for example, the display driving module control the green display units, the red display units and the blue display units of the display screen 20 in the fingerprint detection area 230 to emit light at least in part at the same time, the display driving module may control ratios (that is, ratios of three primary colors, RGB) and/or gray scale values of light signals emitted by the red display units, the green display units and the blue display units in the central detection area and the edge detection area of the fingerprint detection area 230, respectively, such that a brightness of a pattern in the edge detection area is greater than a brightness of a pattern of the central detection area.

It should be understood that in the embodiment of the present application, the excitation light source 11 may emit two light signals of different intensities (such as the first light signal 121 and the second light signal 122 in the above embodiment), or may also emit more light signals of different intensities, and two patterns (such as the first pattern 111 and the second pattern 112 in the above embodiment) or a plurality of patterns may be formed in the fingerprint detection area, which is not limited in the embodiment of the present application.

Optionally, in a specific embodiment, the target light signal emitted by the excitation light source 11 may include a plurality of light signals. Gray scale values of a plurality of patterns formed by the plurality of light signals emitted by the excitation light source 11 decrease sequentially in a descending order of a distance from a center of the fingerprint detection area, that is, a target pattern or spot formed by the target light signal in the fingerprint detection area 230 is a gradient pattern or a gradient spot. In other words, signal intensities of the plurality of light signals corresponding to the plurality of patterns decrease sequentially in a descending order of a distance from a center of the fingerprint detection area 230.

Optionally, a center of the gradient spot may be a center point or other points of the fingerprint detection area 230, that is, a gray scale value of the gradient spot may decrease sequentially from the center point of the fingerprint detection area 230 to the edge thereof, or the gray scale value may decrease sequentially from a non-center point of the fingerprint detection area 230 to the edge, which is not limited in this embodiment of the present application.

Optionally, in some embodiments, the spot formed by the target light signal emitted by the excitation light source 11 in the fingerprint detection area 230 may be a circle, an ellipse, a rectangle, other regular or irregular patterns, and the like, which is not limited in this embodiment of the present application.

Figure 4:
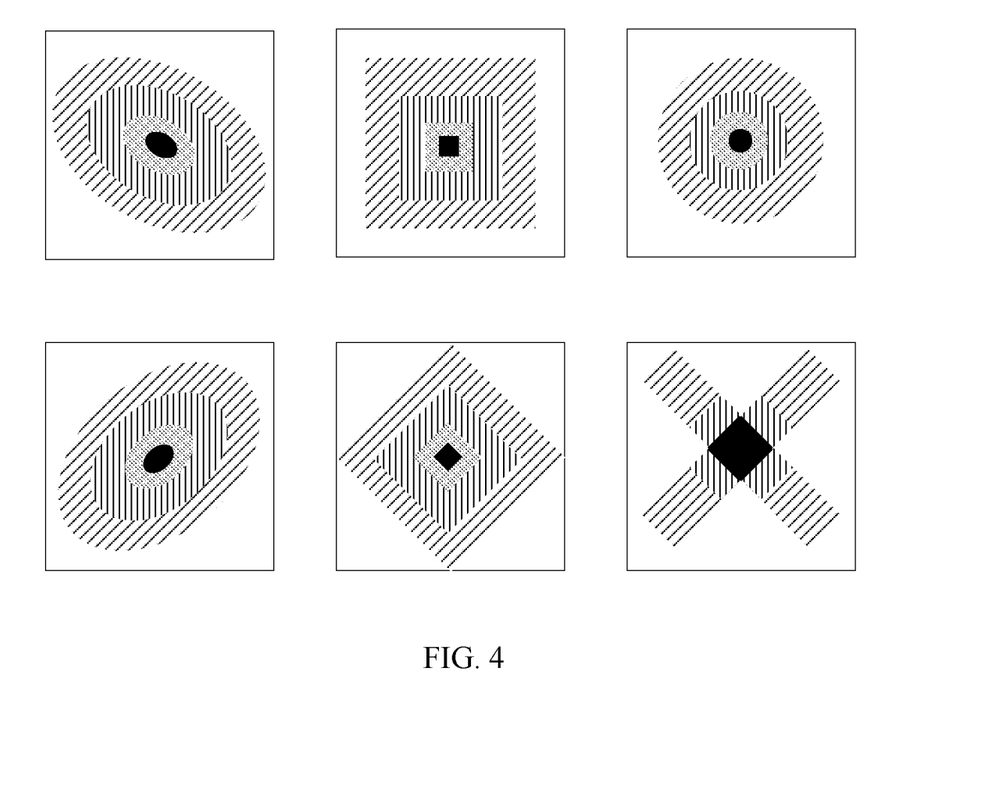
FIG. 4 is a schematic diagram of a gradient spot according to an embodiment of the present application.
Figure 5:
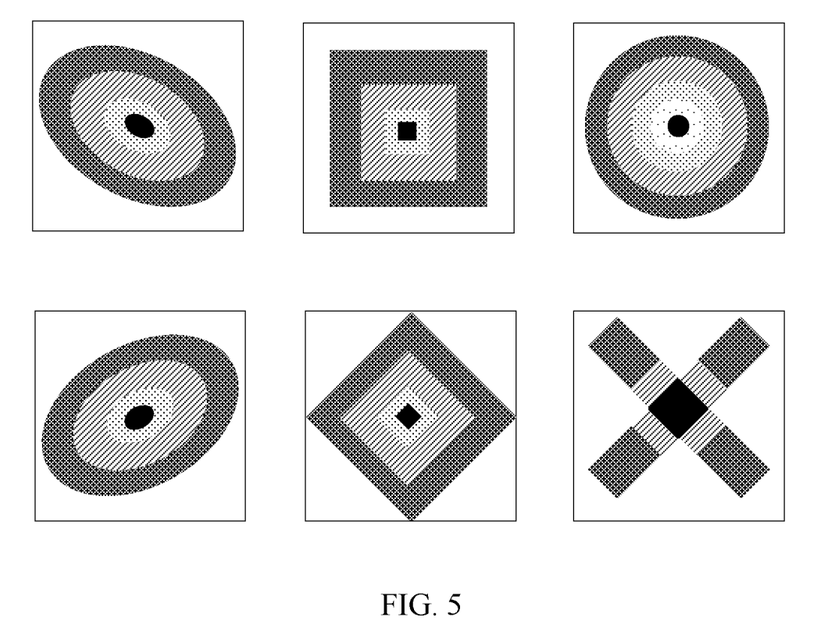
FIG. 5 is a schematic diagram of a gradient spot according to another embodiment of the present application.
Figure 6:
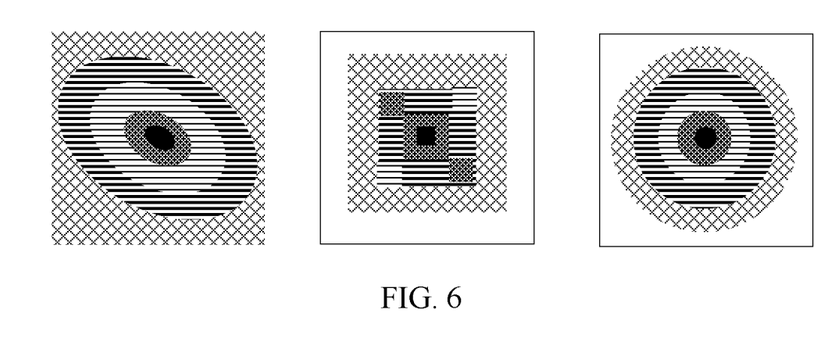
FIG. 6 is a schematic diagram of a gradient spot according to yet another embodiment of the present application.

FIGS. 4 to 6 show schematic diagrams of several different gradient spots formed by the fingerprint detection area 230. FIG. 4 shows gradient spots formed by a combination of three light sources such as a red light source, a green light source and a blue light source using different gray scale values; FIG. 5 shows gradient spots formed by a combination of a single green light source using different gray scale values; and FIG. 6 shows gradient spots of a mixed color formed by a combination of at least one of three light sources, a red light source, a green light source and a blue light source using different gray scale values.

In other words, in FIG. 4, the gradient spots may be formed by a white light having different gray scale values; in FIG. 5, the gradient spots may be formed by a green light having different gray scale values, and optionally, the gradient spots may also be formed by two primary colors (for example, cyan or yellow) having different gray scale values; and in FIG. 6, a plurality of patterns may be formed by a light in a mixed color having different gray scale values, that is, gray scale values and colors of the plurality of patterns of the gradient spots are all different. For example, a first pattern in the plurality of patterns is a green pattern having a gray scale value of 100, and a second pattern is a cyan pattern having a gray scale value of 200.

Optionally, in some embodiments, by controlling the signal intensity of the second light signal 122 and the signal intensity of the first light signal 121 emitted by the excitation light source 11, the signal magnitude of the second pattern 112 and the signal magnitude of the first pattern 111 detected by the optical sensor 12 are enabled to be approximately at the same level or the same magnitude.

Optionally, in some embodiments, magnitudes of intensities of light signals emitted by the excitation light source 11 to different areas of the fingerprint detection area 230 of the display screen 20 may be determined in the following way.

Firstly, the excitation light source 11 emits sampling light signals with the same color and the same gray scale value to the fingerprint detection area 230 under the driving of a display driving module, that is, signal intensities of light signals emitted to different areas are the same. Specifically, when the fingerprint detection device adopts the self-emitting display units 11 of the display screen 20 in the fingerprint detection area 230 as an excitation light source, a signal intensity of a light signal emitted by the self-emitting display units in the fingerprint detection area 230 is the same. That is, a spot formed in the fingerprint detection area 230 is a solid color spot.

Secondly, the optical sensor 12 detects magnitudes of signal magnitudes of light signals received from different areas of the fingerprint detection area 230, that is, the optical sensor 12 samples the light signals in the different areas of the fingerprint detection area 230, and detects sampling values of the light signals.

Finally, according to the sampling values in the different areas of the fingerprint detection area 230, intensities of the light signals emitted by the excitation light source 11 to the different areas of the fingerprint detection area 230 are determined.

For example, if a sampling value in a first area 111 is S1 and a sampling value in a second area 112 is S2, and S1 is greater than S2, a signal intensity P1 of a light signal emitted to the first area 111 can be determined to be smaller than a signal intensity P2 of a light signal emitted to the second area 112, for example, it may be determined that P1/P2 is approximately equal to S2/S1 such that the sampling values of the first area 111 and the second area 112 are approximately at the same level.

Hereinafter, a manner of determining intensities of light signals reflected to different areas will be described with reference to specific examples shown in FIGS. 7 to 10.

Figure 7:
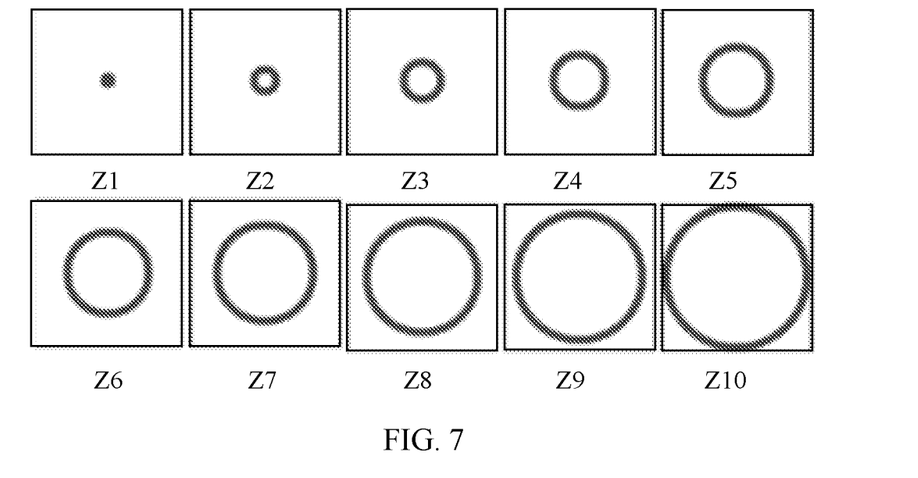
FIG. 7 is an exploded view of zones of a fingerprint detection area.

Firstly, a target pattern or spot of the fingerprint detection area 230 is divided into a plurality of zones. Taking a circular gradient spot as an example, it may be divided into ten zones as shown in FIG. 7, including Z1 to Z10.

Figure 8:
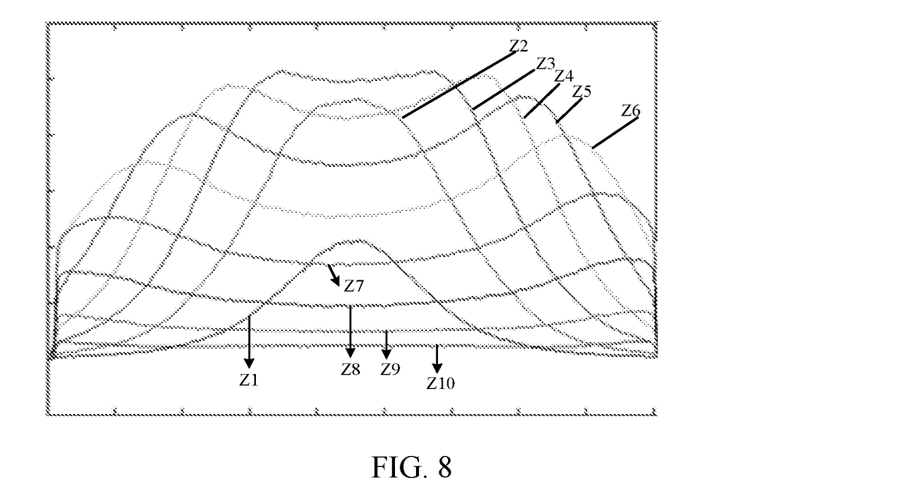
FIG. 8 is a distribution diagram of a signal magnitude captured by an optical sensor in each zone.

Secondly, the excitation light source 11 is used to emit light signals with the same color and the same gray scale value to the ten zones, and determine magnitudes of signal magnitudes captured by the optical sensor 12 in each of the zones Z1 to Z10. FIG. 8 shows a distribution of signal magnitudes captured by the optical sensor in each zone. As can be seen from FIG. 8, a signal magnitude of a zone close to the center of the fingerprint detection area 230 is larger, and a signal magnitude of a zone away from the center of the fingerprint detection area 230 is smaller.

Figure 9:
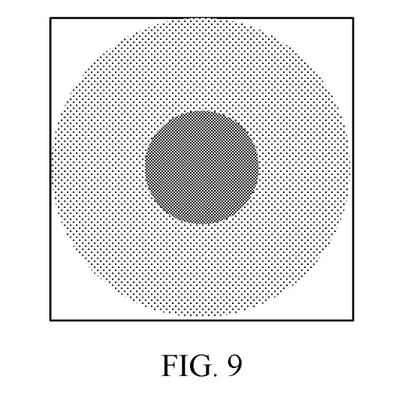
FIG. 9 is a schematic diagram of a gradient spot based on a single green light source design.

Finally, based on distribution of signal magnitudes in different zones shown in FIG. 8, a magnitude of a signal intensity of a light signal emitted by the excitation light source 11 to each zone is determined, and further, a gradient spot formed in the fingerprint detection area 230 could be obtained, as shown in FIG. 9.

Further, according to the gradient spot, the optical sensor 12 re-captures a light signal, specifically, when a user presses a finger against the gradient spot displayed by the display screen 20 in the fingerprint detection area 230, a light signal for generating the gradient spot is reflected by a surface of the finger pressed against the fingerprint detection area 230 and forms a reflected light signal. After passing through the display screen 20 again as fingerprint detection light, the reflected light signal is converged or directed by the optical component 13 to the optical sensor 12, and therefore, a light signal re-captured by the optical sensor 12 becomes the fingerprint detection light.

Figure 10:
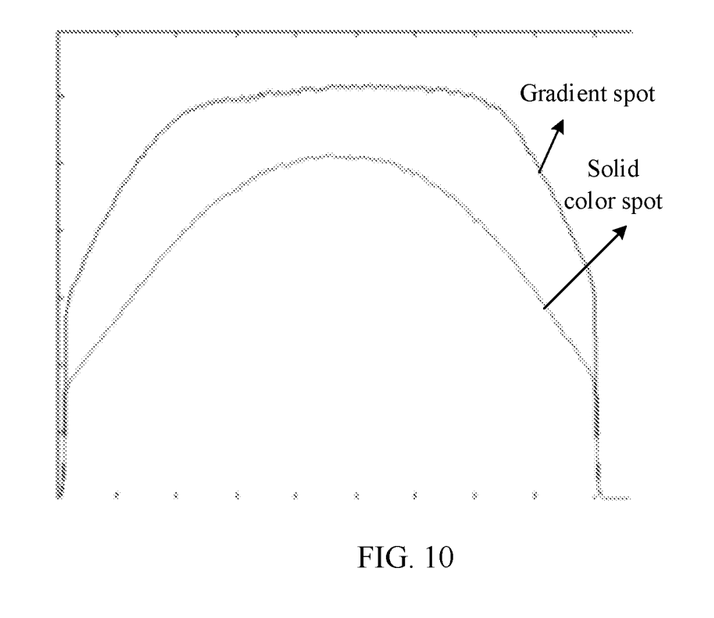
FIG. 10 is a comparison diagram of a signal magnitude captured by an optical sensor based on a solid color spot and a gradient spot.

FIG. 10 is a distribution diagram of signal magnitudes captured by the optical sensor 12 in the case of adopting a solid color spot and a gradient spot. As can be seen from comparison, when a solid color spot is adopted, since contact of a finger in a central detection area of the fingerprint detection area 230 is better, pixel points in the central detection area of the optical sensor 12 enter a saturation area in advance, while since an edge area of the fingerprint detection area 230 receives less light and is in bad contact with a finger, a sampling value of the edge detection area is far from reaching the saturation area. When a gradient spot is adopted, sampling values of the edge detection area are effectively improved, and gray scale values of the central detection area are lower, such that a sampling value of the central detection area is also improved to a certain degree, and sampling values of the optical sensor are generally improved, which is beneficial to improve a fingerprint identification rate.

Figure 11:
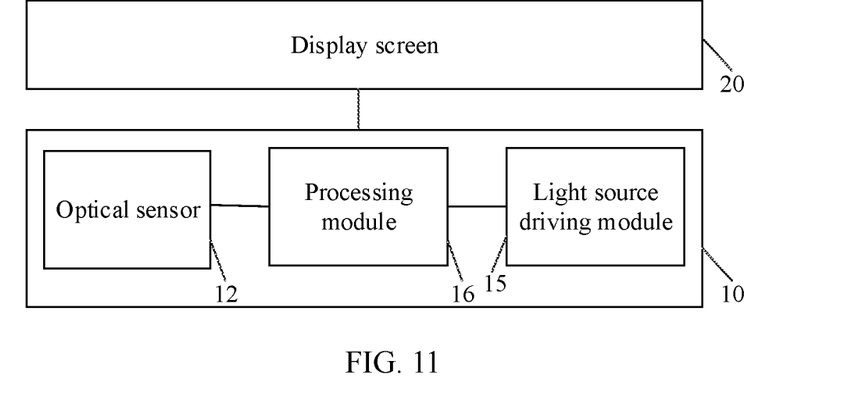
FIG. 11 is a schematic block diagram of a fingerprint detection device according to an embodiment of the present application.

Optionally, in some embodiments, as shown in FIG. 11, the fingerprint detection device 10 may further include a processing module 16, configured to determine a signal intensity of a light signal emitted by the excitation light source 11 to each area of the fingerprint detection area 230 during fingerprint detection according to a sampling light signal in each area of the fingerprint detection area 230 detected by the optical sensor 12, for example, determining the signal intensity of the first light signal 121 and the signal intensity of the second light signal 122.

In a specific embodiment, the processing module 16 may be specifically configured as a microprocessor of the fingerprint detection device 10, or may be an application processor or another processor or a controller of a terminal device applied by the fingerprint detection device 10.

Optionally, the fingerprint detection device 10 may further include a light source driving module 15, configured to drive the excitation light source 11 to display and emit a corresponding light signal according to a signal intensity of a light signal in each area of the fingerprint detection area 230 determined by the processing module 16, such that a corresponding target pattern is displayed in the fingerprint detection area 230, for example, the above gradient spot.

For example, in an embodiment, the light source driving module 15 may drive the excitation light source 11 to emit the first light signal 121 and the second light signal 122 respectively in a central detection area and an edge detection area of the fingerprint detection area 230 such that the display screen 20 displays a target pattern in a non-solid color in the fingerprint detection area, including the first pattern 111 and the second pattern 112.

In a specific embodiment, when the excitation light source 11 adopts self-emitting display units of the display screen 20, the light source driving module 15 may be specifically a display driving module or a display driver of a terminal device applied by the fingerprint detection device. In other embodiments, if the excitation light source of the fingerprint detection device 10 adopts the external light source 14 as shown in FIG. 3, the light source driving module 15 may be specifically a light source driver for driving the external light source 14.

Optionally, in some embodiments, the processing module 16 may further perform a subsequent operation such as fingerprint identification according to fingerprint information of a user's finger detected by the optical sensor 12 when the target pattern (such as the gradient spot described above) is displayed in the fingerprint detection area 230 of the display screen 20. The user's finger may be pressed against the target pattern (such as the gradient spot described above) to perform fingerprint input, and a light signal corresponding to the target pattern is reflected by the user's finger and forms a reflected light signal, and the reflected light serving as fingerprint detection light pass through the display screen 20 and converged or directed by the optical component 13 to the optical sensor 12, and therefore the optical sensor 12 optically images the fingerprint detection light to obtain the fingerprint information of the user's finger, and provides the fingerprint information to the processing module 16 for fingerprint identification and subsequent operations such as user identity authentication. That is, the fingerprint detection device 10 in the embodiment of the present application may also be used for subsequent fingerprint identification and other operations.

It should be understood that in other alternative embodiments, the processing module 16 may also integrate functions of the light source driving module 15, that is, the processing module 16 may also be used to control optical parameters such as a color and a gray scale of a light signal emitted by the excitation light source 11. Under this application scenario, the light source driving module 15 may be omitted.

Figure 12:
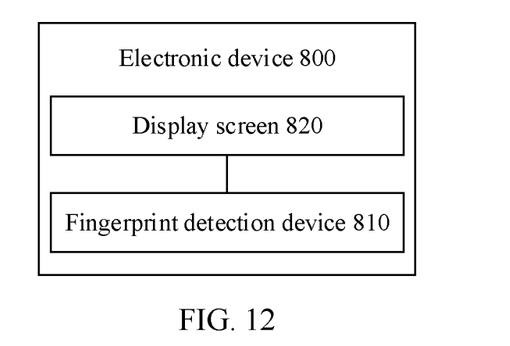
FIG. 12 is a schematic block diagram of an electronic device according to an embodiment of the present application.

An embodiment of the present application further provides an electronic device 800. As shown in FIG. 12, the electronic device 800 may include a display screen 820 and a fingerprint detection device 810. The fingerprint detection device 810 may be the fingerprint detection device 10 in the foregoing embodiments, and disposed under the display screen 820. As an alternative embodiment, the display screen 820 have self-emitting display units, and the self-emitting display units may be used as the excitation light source of the fingerprint detection device 10 for fingerprint detection. Additionally, the fingerprint detection device 810 can be used to perform the content in the method embodiment shown in FIG. 13.

In the foregoing text, the device embodiment of the present application is described in detail with reference to FIGS. 2 to 12. The method embodiment of the present application is described in detail below with reference to FIG. 13. It should be understood that the method embodiment corresponds to the device embodiment, and similar description may refer to the device embodiment.

Figure 13:
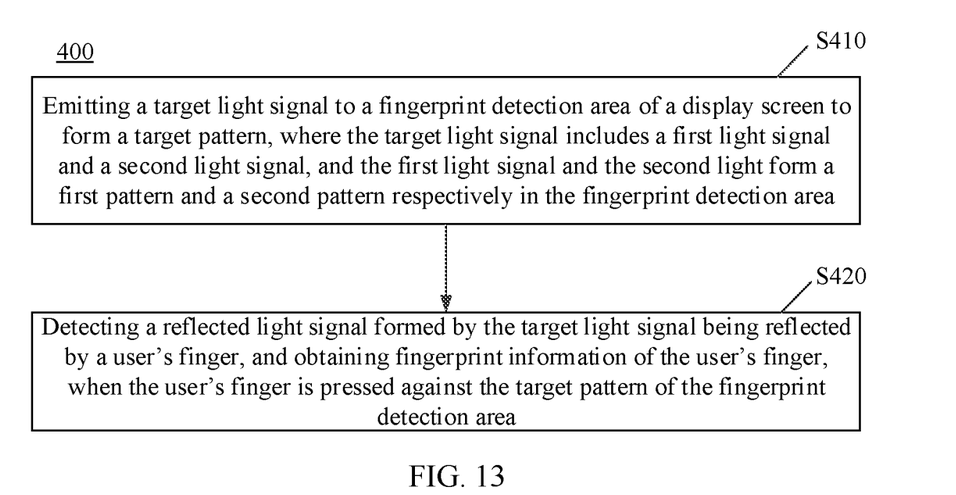
FIG. 13 is a schematic flowchart of a fingerprint detection method according to an embodiment of the present application.

FIG. 13 is a schematic flowchart of a fingerprint detection method according to an embodiment of the present application. It should be understood that the fingerprint detection method 400 may be applied to the fingerprint detection device 10 as shown in FIG. 2 or the electronic device as shown in FIG. 12. As shown in FIG. 13, the fingerprint detection method 400 may include the following content:

S410, emitting a target light signal to a fingerprint detection area of a display screen to form a predetermined target pattern, where the target light signal includes a first light signal and a second light signal, and the first light signal and the second light form a first pattern and a second pattern respectively in the fingerprint detection area;

and the first pattern does not overlap with the second pattern at least in part, the first pattern is closer to a center of the fingerprint detection area than the second pattern, and a signal intensity of the first light signal is less than a signal intensity of the second light signal;

S420: detecting a reflected light signal formed by the target light signal being reflected by a user's finger, and obtaining fingerprint information of the user's finger, when the user's finger is pressed against the target pattern of the fingerprint detection area.

Optionally, in some embodiments, the fingerprint detection method may further include determining the signal intensity of the first light signal and the signal intensity of the second light signal of the target light signal.

Optionally, in some embodiments, determining the signal intensity of the first light signal and the signal intensity of the second light signal of the target light signal includes emitting sampling light signals with the same color and the same gray scale value to the fingerprint detection area; and determining the signal intensity of the first light signal and the signal intensity of the second light signal according to sampling values of the sampling light signals sampled by the optical sensor in an area where the first pattern and the second pattern are located.

Optionally, in some embodiments, a gray scale value and/or a ratio of three primary colors, Red, Green and Blue, RGB of the first pattern is different from those of the second pattern.

Optionally, in some embodiments, if the first pattern and the second pattern are in the same color, the gray scale value of the first pattern is smaller than the gray scale value of the second pattern.

Optionally, in some embodiments, the predetermined pattern is formed in the fingerprint detection area by a target light signal emitted by a light source, where the light source includes at least one of a red light source, a green light source and a blue light source; and the method further includes controlling gray scale values and/or ratios of three primary colors, Red, Green and Blue, RGB of the first light signal and the second light signal emitted by at least one of the red light source, the green light source and the blue light source such that the gray scale value and/or the ratio of three primary colors, Red, Green and Blue, RGB of the first pattern are different from those of the second pattern.

Optionally, in some embodiments, the predetermined pattern includes a gradient spot having a plurality of patterns, and light signals corresponding to the plurality of patterns decrease sequentially in a descending order of a distance from a center of the fingerprint detection area.

Optionally, in some embodiments, the first pattern is a first shape centered on a first feature point, and the second pattern is a second shape centered on a second feature point, where the first feature point and the second feature point are center points of the fingerprint detection area, and the first shape is located within the second shape.

Optionally, in some embodiments, the method further includes performing fingerprint identification according to the fingerprint information of the user's finger.

It should be understood that, in the method embodiment of the present application, values of sequence numbers of the above-mentioned various processes do not mean an order of execution which should be determined based upon functionalities and internal logics thereof, rather than setting any limitation to an implementation process of the embodiment of the present application.

It should be understood that the processor of the embodiment of the present application may be an integrated circuit chip with signal processing capability. In an implementation process, steps of the foregoing method embodiment may be completed by using an integrated logical circuit of hardware in the processor or an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and the logical block diagrams disclosed in the embodiments of the present application can be implemented or executed. The general purpose processor may be a microprocessor or the processor may be any conventional processor or the like. Steps of the method disclosed in the embodiments of the present application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps of the foregoing method in combination with hardware of the processor.

It may be understood that fingerprint identification in the embodiments of the present application may further include a memory, which may be a volatile memory or a nonvolatile memory, or may include both a volatile memory and a nonvolatile memory. The non-volatile memory may be a read-only memory (ROM), a programmable ROM (PROM), an erasable PROM (EPROM), or an electrically EPROM (EEPROM) or a flash memory. The volatile memory may be a random access memory (RAM) and used as an external cache. By way of example and not limitation, RAMs of many forms are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this paper aims to include but is not limited to these memories and any memory of another proper type.

An embodiment of the present application further provides a computer readable storage medium, where the computer readable storage medium stores one or more programs, and the one or more programs include an instruction. When the instruction is executed by a portable electronic device that includes a plurality of application programs, the portable electronic device can execute the method in the embodiment shown in FIG. 13.

The embodiment of the present application also provides a computer program including instructions that, when executed by a computer, cause the computer to execute the method of the embodiment shown in FIG. 13.

An embodiment of the present application further provides a chip including an input and output interface, at least one processor, at least one memory and a bus, where the at least one memory is configured to store an instruction, the at least one processor is configured to call an instruction in the at least one memory to execute the method of the embodiment shown in FIG. 13.

A person of ordinary skill in the art may be aware that units and algorithm steps in the examples described with reference to the embodiments disclosed in this paper may be implemented by electronic hardware or a combination of computer software and electronic hardware. Whether these functions are performed by hardware or software depends on particular applications and designed constraint conditions of the technical solutions. A person skilled in the art may use different methods to implement the described functions for each particular application, but it should not be considered that the implementation goes beyond the scope of this application.

Those skilled in the art to which the present invention pertains may clearly understand that, for convenience and simplicity of description, for the specific working processes of the system, the device and the units described above, please refer to corresponding processes in the foregoing method embodiment, and they will not be repeated redundantly herein.

In the several embodiments provided in the present application, it should be understood that the disclosed system, apparatus, and method may be implemented in another manner. For example, the described apparatus embodiment is merely an example. For example, the described device embodiment is merely an example. For example, the unit division is merely logical function division and may be other division in actual implementation. For example, a plurality of units or components may be combined or integrated into another system, or some features may be ignored or not performed. From another point of view, the displayed or discussed mutual coupling or direct coupling or communication connection may be indirect coupling or communication connection via some interfaces, devices or units, and may be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the present embodiments according to actual demands.

In addition, the respective functional units in the embodiments of the present application may be integrated in a processing unit, or the respective units exist separately and physically, or two or more units are integrated in one unit.

If the functional unit is implemented in the form of the software functional unit and is sold or used as an independent product, it may be stored in a computer readable storage medium. Based on such an understanding, the technical solutions of the present application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present application. The foregoing storage medium includes: any medium that can store program codes, such as a USB flash drive, a removable hard disk, a read-only memory (ROM), a random access memory (RAM), a magnetic disk, or an optical disc.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of this application shall be subject to the protection scope of the claims.

What is claimed is:

1. A fingerprint detection device, configured to be disposed under a display screen of an electronic device, wherein a fingerprint detection area of the fingerprint detection device is located in a display area of the display screen and comprises an edge detection area and a central detection area, and the fingerprint detection device comprises an optical component and an optical sensor,
wherein the optical component is configured to direct or converge a fingerprint detection signal to the optical sensor, the fingerprint detection signal comprises fingerprint detection light that is formed by light reflected by a finger above the fingerprint detection area and passing through the display screen when the finger is illuminated by a light spot provided in the fingerprint detection area of the display screen; and
the optical sensor is disposed below the optical component and comprises a plurality of photo detectors arranged in an array, and is configured to detect fingerprint information according to the fingerprint detection signal;
wherein a brightness of the light spot in the edge detection area of the fingerprint detection area is greater than a brightness of the light spot in the central detection area of the fingerprint detection area, so as to increase a signal magnitude of fingerprint detection light from the edge detection area captured by the optical sensor.

2. The device according to claim 1, wherein the fingerprint detection device is configured to use a part of self-emitting display units of the display screen as an excitation light source for fingerprint detection, and the light spot is a specific pattern displayed by the self-emitting display units in the fingerprint detection area of the display screen.

3. The device according to claim 2, wherein the light spot is a gradient spot, and a brightness of the gradient spot gradually decreases from the edge of the fingerprint detection area toward the center of the fingerprint detection area.

4. The device according to claim 2, wherein an intensity of a light signal emitted by self-emitting display units in the edge detection area is greater than an intensity of a light signal emitted by self-emitting display units in the central detection area.

5. The device according to claim 1, wherein the light spot includes a first pattern and a second pattern that do not overlap at least in part, wherein the first pattern is closer to a center of the fingerprint detection area than the second pattern, and a brightness of the first pattern is less than a brightness of the second pattern.

6. The device according to claim 5, wherein the light spot is a gradient spot having a plurality of patterns, and light signals corresponding to the plurality of patterns decrease sequentially in a descending order of a distance from a center of the fingerprint detection area.

7. The device according to claim 6, wherein gray values and/or ratios of three primary colors of red, green and blue (RGB) of the plurality of patterns of the gradient spot are different.

8. The device according to claim 6, wherein the gradient spot is a solid color gradient spot, and gray values of the solid color gradient spot decrease sequentially in a descending order of a distance from a center of the fingerprint detection area.

9. The device according to claim 6, wherein the gradient spot is a specific pattern displayed by self-emitting display units in the fingerprint detection area of the display screen, and the self-emitting display units include a red display unit, a green display unit and a blue display unit, wherein the red display unit, the green display unit and the blue display unit are used to respectively emit corresponding light signals under the drive of a light source driving module to form the gradient spot in the fingerprint detection area.

10. The device according to claim 9, wherein the light source driving module is configured to control gray value of at least one display unit among the red display unit, the green display unit, and the blue display unit of the self-emitting display units, so that gray values of the plurality of patterns of the gradient spot decrease sequentially in a descending order of a distance from a center of the fingerprint detection area.

11. The device according to claim 10, wherein the light source driving module is also configured to control ratios of a red light signal, a green light signal and a blue light signal emitted by the red display unit, the green display unit and the blue display unit of the self-emitting display units, so that ratios of the three primary colors of red, green and blue (RGB) of the plurality of patterns of the gradient spot are different.

12. The device according to claim 9, wherein the optical sensor is also configured to pre-sample a light signal in the fingerprint detection area and detect a sampling value of the light signal, wherein the self-emitting display units in the fingerprint detection area have the same display color and the same gray value, and the sampling value is used to determine an intensity of a light signal emitted by the self-emitting display units in the fingerprint detection area to form the gradient spot.

13. A fingerprint detection method, suitable for an electronic device with a display screen to realize under-screen optical fingerprint detection, comprising:
forming a non-uniform light spot in a fingerprint detection area, a brightness of the non-uniform light spot in an edge detection area of the fingerprint detection area being greater than a brightness in a central detection area of the fingerprint detection area, wherein the fingerprint detection area is located in a display area of the display screen; and
guiding or converging fingerprint detection light to an optical sensor when a user's finger is pressed against the fingerprint detection area, wherein the fingerprint detection light is formed by the non-uniform light spot illuminating the finger, reflected by the finger, and passing through the display screen, and the optical sensor comprises a plurality of photo detectors arranged in an array; and
receiving the fingerprint detection light with the use of the optical sensor, and detecting fingerprint information of the finger according to the fingerprint detection light.

14. The method according to claim 13, wherein the light spot is a gradient spot with a plurality of patterns, and light signals corresponding to the plurality of patterns decrease sequentially in a descending order of a distance from a center of the fingerprint detection area.

15. The method according to claim 14, wherein the gradient spot is a specific pattern displayed by self-emitting display units in the fingerprint detection area of the display screen, and the self-emitting display units include a red display unit, a green display unit and a blue display unit, wherein the red display unit, the green display unit and the blue display unit are used to respectively emit corresponding light signals under the drive of a light source driving module to form the gradient spot in the fingerprint detection area.

16. The method according to claim 15, wherein the method further comprises:
    forming a pattern with the same color and the same gray value in the fingerprint detection area of the display screen in advance; and
    pre-sampling a light signal in the fingerprint detection area and detecting a sample value of the light signal with the use of the optical sensor; and
    determining an intensity of a light signal emitted by the self-emitting display units in the fingerprint detection area for forming the gradient spot according to the sample value.

17. The method according to claim 15, wherein the step of forming a non-uniform light spot in a fingerprint detection area comprises:
    driving at least one display unit among a red display unit, a green display unit and a blue display unit of the self-emitting display units to emit a corresponding light signal according to a specific gray value, so that gray values of the plurality of patterns of the gradient spot decrease sequentially in a descending order of a distance from a center of the fingerprint detection area.

18. The method according to claim 17, wherein the step of forming a non-uniform light spot in a fingerprint detection area also comprises:
    driving the red display unit, the green display unit and the blue display unit of the self-emitting display units to emit corresponding light signals in accordance with specific ratios of a red light signal, a green light signal and a blue light signal, so that ratios of the three primary colors of red, green and blue (RGB) of the plurality of patterns of the gradient spot are different.

19. An electronic device, comprising: a display screen and a fingerprint detection device disposed under the display screen, wherein a fingerprint detection area of the fingerprint detection device is located in a display area of the display screen, and comprises an edge detection area and a central detection area, the fingerprint detection device comprises an optical component and an optical sensor, wherein the optical component is configured to direct or converge a fingerprint detection signal to the optical sensor, the fingerprint detection signal comprises fingerprint detection light that is formed by light reflected by a finger above the fingerprint detection area and passing through the display screen when the finger is illuminated by a light spot provided in the fingerprint detection area of the display screen; and the optical sensor is disposed below the optical component and comprises a plurality of photo detectors arranged in an array, and is configured to detect fingerprint information according to the fingerprint detection signal; wherein a brightness of the light spot in the edge detection area of the fingerprint detection area is greater than a brightness of the light spot in the central detection area of the fingerprint detection area, so as to increase a signal magnitude of fingerprint detection light from the edge detection area captured by the optical sensor.

* * * * *